United States Patent
Kao

(10) Patent No.: US 11,144,494 B1
(45) Date of Patent: Oct. 12, 2021

(54) METHOD OF REMOTE CONTROL USING USB THROUGH PCI-E

(71) Applicant: YUAN High-Tech Development Co., Ltd., Taipei (TW)

(72) Inventor: Wei-Hsiang Kao, Taipei (TW)

(73) Assignee: YUAN High-Tech Development Co., Ltd., Taipei (TW)

( * ) Notice: Subject to any disclaimer, the term of this patent is extended or adjusted under 35 U.S.C. 154(b) by 0 days.

(21) Appl. No.: 16/904,833

(22) Filed: Jun. 18, 2020

(51) Int. Cl.
*G06F 13/40* (2006.01)
*G06F 13/42* (2006.01)

(52) U.S. Cl.
CPC ...... *G06F 13/4081* (2013.01); *G06F 13/4282* (2013.01); *G06F 2213/0026* (2013.01); *G06F 2213/0042* (2013.01)

(58) Field of Classification Search
None
See application file for complete search history.

(56) References Cited

U.S. PATENT DOCUMENTS

| | | | |
|---|---|---|---|
| 10,840,735 B1 * | 11/2020 | Cooper | H02J 3/0075 |
| 10,860,519 B2 * | 12/2020 | Kao | G06F 1/1632 |
| 10,860,522 B2 * | 12/2020 | Kung | G06F 13/4022 |
| 2004/0198291 A1 * | 10/2004 | Wilcox | H04B 1/44 455/269 |
| 2017/0103038 A1 * | 4/2017 | Syed | G06F 13/4282 |
| 2018/0225230 A1 * | 8/2018 | Litichever | G06F 21/82 |
| 2019/0173466 A1 * | 6/2019 | Prevost | H04B 1/006 |

* cited by examiner

*Primary Examiner* — Henry Tsai
*Assistant Examiner* — Christopher A Bartels
(74) *Attorney, Agent, or Firm* — Demian K. Jackson; Jackson IPG PLLC

(57) ABSTRACT

A method is provided for remote control. Peripheral component interconnect express (PCI-E) is used for controlling with universal serial bus (USB) type-C (USB-C). A controlling terminal inputs a control signal of switching through a user interface. The controlling terminal transfers the control signal to a PCI-E connector of an image capture unit through a first port. After being handled and transformed by a processing device, the control signal is transferred with a USB-C connector of the image capture unit to at least one controlled terminal through a second port. Thus, the image capture unit is expanded in function to obtain keyboard-video-mouse switch (KVM Switch) among the category of image capturing cards. In summary, with a remote connection, a controlling terminal remotely controls a controlled terminal while simple flow, enhanced speed, and effective cost-down are achieved.

12 Claims, 3 Drawing Sheets

METHOD OF REMOTE CONTROL USING USB THROUGH PCI-E

TECHNICAL FIELD OF THE INVENTION

The present invention relates to remote control; more particularly, to expanding an image capture unit in function to obtain keyboard-video-mouse switch (KVM Switch) among the category of image capturing cards, where simple flow, enhanced speed, and effective cost-down are achieved.

DESCRIPTION OF THE RELATED ARTS

Generally, on performing a remote operation, a keyboard-video-mouse switch (KVM Switch) is quite often installed to operate a controlled terminal by a controlling terminal through the KVM switch.

However, in terms of the conventional KVM switch, it must be used with a connection of network. Once the connection of network is interrupted, the operation stops. Besides, the conventional KVM switch has not only a much complicated build process but also a high cost of equipment and implementation.

Hence, the prior art does not fulfill all users' expectations on actual use.

SUMMARY OF THE INVENTION

The main purpose of the present invention is to connect a controlling terminal to a peripheral component interconnect express (PCI-E) connectors with an image capture unit to remotely control a controlled terminal through a universal serial bus (USB) type-C (USB-C) connector connected with the controlled terminal without any switch and network, where the image capture unit is expanded in function to obtain KVM switch among the category of image capturing cards; and, in summary, with a remote connection, the controlling terminal remotely controls the controlled terminal while simple flow, enhanced speed, and effective cost-down are achieved.

To achieve the above purpose, the present invention is a method of remote control using USB through PCI-E, comprising steps of: (a) first step: obtaining a controlling terminal, where the controlling terminal has a user interface and a first port; (b) second step: connecting an image capture unit to the controlling terminal, where the image capture unit comprises a PCI-E connector, a processing device, and at least one USB-C connector; the PCI-E connector connects to the first port; the processing device connects to the PCI-E connector and the USB-C connector; the PCI-E connector is a connecting device supporting hot plugging and heat exchange with a power of +3.3 valts (V), 3.3 auxiliary volts (Vaux), and +12V provided; and, on processing heat exchange by the PCI-E connector with a voltage controller comprised in the image capture unit as the controlling terminal connects to the image capture unit, the voltage controller provides power to the controlling terminal in a gradual manner until a normal-operation voltage level of the controlling terminal is reached; (c) third step: connecting at least one controlled terminal to the image capture unit, where the controlled terminal has a second port; and the second port connects to the USB-C connector; and (d) fourth step: inputting a control signal of switching by the controlling terminal through the user interface; transferring the control signal by the controlling terminal to the PCI-E connector of the image capture unit through the first port; and, after being processed and transformed by the processing device, transferring the control signal from the USB-C connector to the controlled terminal through the second port, where the controlling terminal and the controlled terminal are connected and communicated to operate the controlled terminal by the controlling terminal with the user interface. Accordingly, a novel method of remote control using USB through PCI-E is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
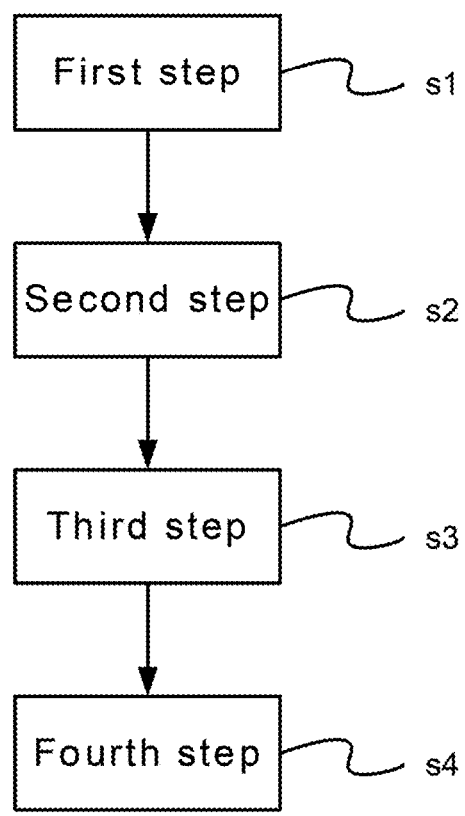
FIG. 1 is the flow view showing the preferred embodiment according to the present invention.
Figure 2:
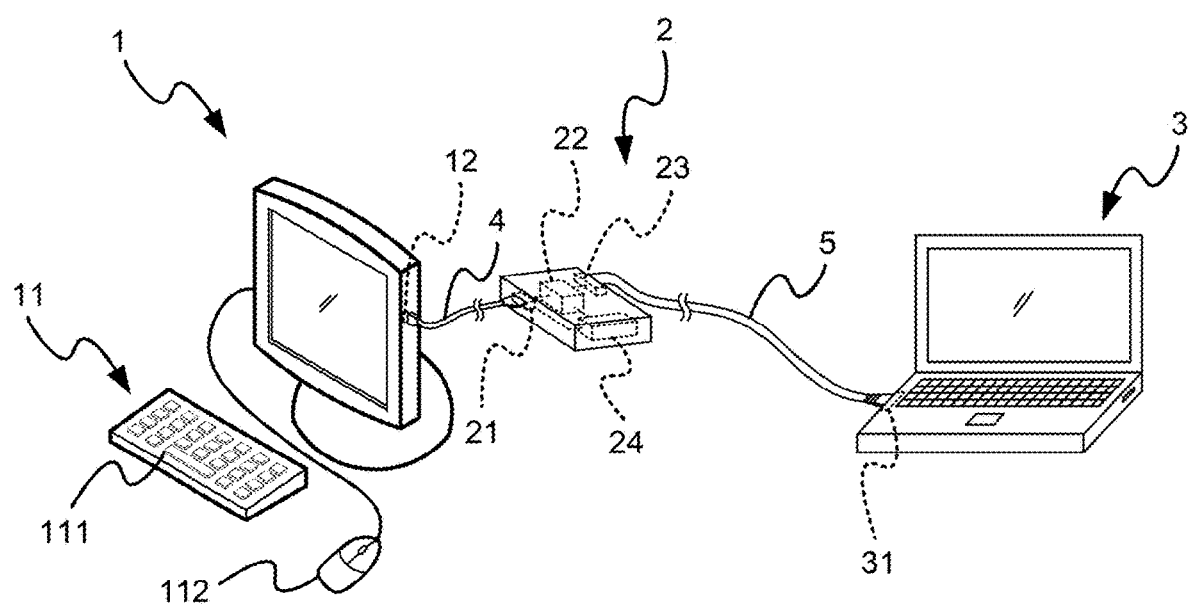
FIG. 2 is the structural view.
Figure 3:
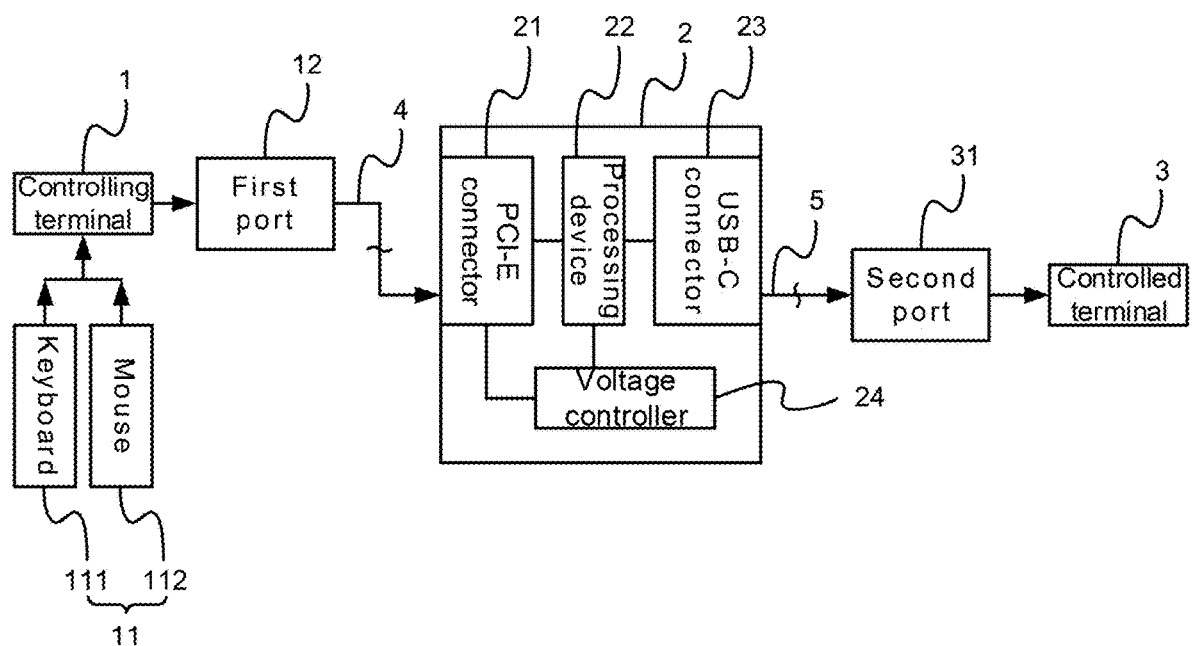
FIG. 3 is the block view.

Please refer to FIG. 1 to FIG. 3, which are a flow view, a structural view, and a block view showing a preferred embodiment according to the present invention. As shown in the figures, the present invention is a method of remote control using universal serial bus (USB) through peripheral component interconnect express (PCI-E), which comprises the following steps:

(a) First step s1: A controlling terminal 1 is set. The controlling terminal 1 has a user interface 11 and a first port 12.

(b) Second step s2: An image capture unit 2 connects to the controlling terminal 1. The image capture unit 2 comprises a PCI-E connector 21, a processing device 22, and at least one USB type-C (USB-C) connector 23. The PCI-E connector 21 connects to the first port 12. The processing device 22 connects to the PCI-E connector 21 and the USB-C connector 23. The USB-C connector 23 contains a USB 2.0 connector inside (not shown in the figures). The PCI-E connector 21 is a connecting device supporting hot plugging and heat exchange with a power of +3.3V, 3.3Vaux, and +12V provided. Therein, on processing heat exchange by the PCI-E connector 21, the controlling terminal 1 and the image capture unit 2 are connected through a heat-exchange connection with a voltage controller 24 comprised in the image capture unit 2. When the controlling terminal 1 connects to the image capture unit 2, the voltage controller 24 provides power to the controlling terminal 1 in a gradual manner with monitoring and management through a transferring line of the PCI-E connector 21 from the image capture unit 2 to the controlling terminal 1 until a normal-operation voltage level of the controlling terminal 1 is reached.

(c) Third step s3: At least one controlled terminal 3 connects to the image capture unit 2. The controlled terminal 3 has a second port 31. The second port 31 connects to the USB-C connector 23.

(d) Fourth step s4: The user interface 11 of the controlling terminal 1 inputs a control signal of switching. The controlling terminal 1 transfers the control signal to the PCI-E connector 21 of the image capture unit 2 through the first port 12. After being processed and transformed by the processing device 22, the control signal is transferred to the controlled terminal 3 through the second port 31 by the USB-C connector 23, where the controlling terminal 1 and the controlled terminal 3 are connected and communicated to operate the controlled terminal 3 by the controlling terminal 1 with the user interface 11. Thus, through the connection with the image capture unit 2, the controlling terminal 1 connects to the PCI-E connectors 21 to remotely control the controlled terminal 3 through the USB-C connector 23 connected with the controlled terminal 3 without any switch and network. Consequently, the image capture unit 2 is expanded in function to obtain keyboard-video-mouse switch (KVM Switch) among the category of image capturing cards. In summary, with a remote connection, the controlling terminal 1 remotely controls the controlled terminal 3 while simple flow, enhanced speed, and effective cost-down are achieved.

In a state-of-use, the controlling terminal 1 is a desktop computer or a laptop computer; the user interface 11 is a keyboard 111, a mouse 112, or a combination of keyboard and mouse; and the controlled terminal 3 is a desktop computer, a laptop computer, or a server. Hence, by setting a shortcut key for starting the image capture unit 2 at the controlling terminal 1 or the keyboard 111 to process remote control, the mouse 112 clicks the shortcut key in the controlling terminal 1, or the keyboard 111 starts the shortcut key, to input the control signal through the user interface 11 for achieving easy operation.

In a state-of-use, the first port 12 is a PCI-E connector slot having a specification of PCI-E X2, PCI-E X4, PCI-E X8, or PCI-E X10; the PCI-E connector 21 is PCI-E Gen1, PCI-E Gen2, PCI-E Gen3, or PCI-E Gen4 having 2 channels, 4 channels, 8 channels, or 10 channels, or is a connector having an interface of a specification of M.2 PCI-E, Mini-card (MC) PCI-E, or Thunderbolt (TB) PCI-E; and the second port 31 is a high-definition multimedia interface (HDMI) connector or a DisplayPort connector. Thus, the speed of signal transfer is improved to meet actual requests.

In a state-of-use, the first port 12 and the PCI-E connector 21 are connected through a first transfer interface 4; the second port 31 and the USB-C connector 23 are connected through a second transfer interface 5; and the first transfer interface 4 and the second transfer interface 5 are transfer lines. Thus, the image capture unit 2 respectively connects to the controlling terminal 1 and the controlled terminal 3 through the first transfer interface 4 and the second transfer interface 5 for processing requested remote operation without network.

To sum up, the present invention is a method of remote control using USB through PCI-E, where, through the connection with an image capture unit, a controlling terminal connects to a PCI-E connectors to remotely control a controlled terminal through a USB-C connector connected with the controlled terminal without any switch and network; consequently, the image capture unit is expanded in function to obtain KVM switch among the category of image capturing cards; and, in summary, with a remote connection, the controlling terminal remotely controls the controlled terminal while simple flow, enhanced speed, and effective cost-down are achieved.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of remote control using universal serial bus (USB) through peripheral component interconnect express (PCI-E) comprising steps of:
   obtaining a controlling terminal having a user interface and a first port;
   connecting an image capture unit to said controlling terminal, wherein said image capture unit comprises a voltage controller, a PCI-E connector connected to the first port, a processing device connected to the PCI-E connector, and at least one USB type-C (USB-C) connector connected to the processing device; wherein said PCI-E connector is a connecting device supporting hot plugging and heat exchange with a power of +3.3V, 3.3Vaux, and +12V provided; and, on processing heat exchange by said PCI-E connector with the voltage controller as said controlling terminal connects to said image capture unit, said voltage controller provides power to said controlling terminal in a gradual manner until a normal-operation voltage level of said controlling terminal is reached;
   connecting at least one controlled terminal to said image capture unit, wherein said controlled terminal has a second port; and said second port connects to said USB-C connector;
   setting a shortcut key configured for starting the image capture unit; and
   inputting a control signal of switching by said controlling terminal through said user interface; transferring said control signal by said controlling terminal to said PCI-E connector of said image capture unit through said first port; and, after being processed and transformed by said processing device, transferring said control signal from said USB-C connector to said controlled terminal through said second port, wherein said controlling terminal and said controlled terminal are connected and communicated to operate said controlled terminal by said controlling terminal with said user interface.

2. The method according to claim 1, wherein, said controlling terminal is selected from a group consisting of a desktop computer and a laptop computer.

3. The method according to claim 1, wherein, said user interface is selected from a group consisting of a keyboard, a mouse, and a combination of keyboard and mouse.

4. The method according to claim 1, wherein, said first port is a PCI-E connector slot having a specification selected from a group consisting of PCI-E X2, PCI-E X4, PCI-E X8, and PCI-E X10.

5. The method according to claim 1, wherein, said PCI-E connector is selected from a group consisting of PCI-E Gen1, PCI-E Gen2, PCI-E Gen3, and PCI-E Gen4 having a plurality of channels selected from a group consisting of 2 channels, 4 channels, 8 channels, and 10 channels.

6. The method according to claim 1, wherein, said PCI-E connector is a connector having an interface of a specification selected from a group consisting of M.2 PCI-E, Mini-card (MC) PCI-E, and Thunderbolt (TB) PCI-E.

7. The method according to claim 1, wherein, said controlled terminal is selected from a group consisting of a desktop computer, a laptop computer, and a server.

8. The method according to claim 1, wherein, said second port is selected from a group consisting of a high-definition multimedia interface (HDMI) connector and a DisplayPort connector.

9. The method according to claim 1, wherein, said USB-C connector has a USB 2.0 connector contained inside.

10. The method according to claim 1, wherein, said first port and said PCI-E connector are connected through a first transfer interface.

11. The method according to claim 1, wherein, said second port and said USB-C connector are connected through a second transfer interface.

12. The method according to claim 1, wherein, on connecting said controlling terminal and said image capture unit through a heat-exchange connection, said voltage controller provides power to said controlling terminal in a gradual manner with monitoring and management through a transferring interface of said PCI-E connector from said image capture unit to said controlling terminal until an operation voltage of said controlling terminal is reached.

* * * * *